United States Patent [19]
Kim

[11] Patent Number: 6,009,283
[45] Date of Patent: Dec. 28, 1999

[54] METHOD FOR SENSING FILM TRANSPORT ERROR IN AN APS CAMERA

[75] Inventor: Byung-Su Kim, Kyeongsangnam-do, Rep. of Korea

[73] Assignee: Samsung Aerospace Industries, Ltd., Rep. of Korea

[21] Appl. No.: 09/114,974

[22] Filed: Jul. 14, 1998

[30] Foreign Application Priority Data

Jul. 15, 1997 [KR] Rep. of Korea ................. 97-32787

[51] Int. Cl.$^6$ ................................................. G03B 1/00
[52] U.S. Cl. ................................................. 396/409
[58] Field of Search .......................... 396/387, 395, 396/396, 397, 398, 406, 409

[56] References Cited

U.S. PATENT DOCUMENTS

| | | |
|---|---|---|
| 4,885,599 | 12/1989 | Goto et al. . |
| 5,548,363 | 8/1996 | Ohtsuka ................. 396/409 |
| 5,627,617 | 5/1997 | Kazami et al. . |
| 5,835,803 | 11/1998 | Kitani ................. 396/409 |
| 5,842,066 | 11/1998 | Nakamura et al. ............ 396/409 |

FOREIGN PATENT DOCUMENTS 2 318 644  4/1998  United Kingdom .

*Primary Examiner*—Howard B. Blankenship
*Attorney, Agent, or Firm*—Fish & Richardson P.C.

[57] ABSTRACT

An apparatus for transporting film within an APS camera includes a perforation sensor, a controller, a film transporter, and a motor. The controller receives signals from the perforation sensor, and controls the film transport in response to the electric signal. The control unit also controls the film transporter to rewind the film and then wind the film to a predetermined position. During winding the controller counts a time period during which a perforation is not sensed by the perforation sensor, and compares the time period with a predetermined time. The controller then controls the film transporter to wind the film so long as the time period is less than the predetermined time; and stopping winding of the film at a position when a state of a signal from the perforation sensor changes, when the time period exceeds the predetermined time.

4 Claims, 4 Drawing Sheets

METHOD FOR SENSING FILM TRANSPORT ERROR IN AN APS CAMERA

BACKGROUND OF THE INVENTION (a) Field of the Invention

The present invention relates to an APS (Advanced Photo System) camera, more particularly to apparatus and method for moving a film in an APS camera.

(b) Description of the Related Art

Generally, a conventional 35 mm camera uses 35 mm having perforations formed on both edges of the film. Each frame of the film has eight perforations on both edges, and loading and transporting of the film is controlled according to the number of perforations detected.

In a conventional camera, when the shutter release button is pressed by a user, one frame of the film is exposed. After exposure, the film is transported across a shutter region of the camera. Perforations on the edge of the film are detected by perforation sensors and counted by a counter. When the counter counts a total of eight perforations, the controller determines that film transport is complete and stops the film transport, thereby placing the next frame in position for exposure.

In an APS camera conventional 35 mm film is not used. Rather, as shown in FIG. 2, film 5 for an APS camera has only two perforations, 6 and 7, which are formed along a single edge of the film. The first perforation 6 is formed at a position indicating the start position of a frame 8 and the second perforation 7 is formed at a position indicating the end position of the frame. Once a frame of the film 5 is exposed at the shutter region, the exposed film is transported and generally wound around a take-up spool. After sensing the first perforation, the film transport stops when the second perforation 7 is sensed by a perforation sensor 10. If the perforation sensor 10, or advancement motor (not shown) of the camera transport malfunctions during transporting of the film, the exposed film will not be transported completely. Therefore, taking another picture would cause the exposed film to be exposed again or at least cause overlappingexposed images.

With reference to FIG. 5, a method of solving the above problem is described. The amplitude of an output signal 12 from the perforation sensor changes each time a perforation is detected during film transport. When an error occurs during transporting of the film, between the first perforation 6 and the second perforation 7 of a frame(section x), transport of the film stops at the first beginning perforation of the immediately succeeding frame (designated by point A).

On the other hand, when an error occurs during film transport between second perforation 7 and a first perforation 6 of an immediately succeeding frame(section y), transport of the film is performed so that the next frame is skipped and transport is stopped at a first perforation of the next frame (at point B)resulting in a wasted frame.

SUMMARY OF THE INVENTION

In view of the prior art described above, it is an object of the present invention to provide an apparatus and method for transporting a film in an APS camera without wasting film frames.

In one aspect of the present invention, the apparatus comprises a perforation sensor which senses perforations formed in a film and generates a signal according to perforation sensed; a controller which controls winding of the film when winding error occurs or power is interrupted (e.g., due to changing of the camera battery); and a film transporter for moving the film under the control of the controller. The controller is configured to rewind the film to a predetermined position and then wind the film. During winding the controller counts a time period during which a perforation is not sensed by the perforation sensor, and compares the time period with a predetermined time. The controller then controls the film transporter to wind the film when the time period is less than the predetermined time; and stops the winding of the film at a position where the state of a signal from the perforation sensor changes, when the time period exceeds the predetermined time.

In another aspect of the invention, a method comprises the steps of determining whether or not a winding error occurs or power to the camera is interrupted; stopping winding of the film and rewinding the film to a predetermined position; starting winding of the film; counting, during winding of the film, a time period during which a perforation is not sensed; comparing the time period with a predetermined time; and stopping the winding of the film at a position where a state of a signal indicating whether a perforation sensed is changed when the time period exceeds the predetermined time.

BRIEF DESCRIPTION OF THE DRAWINGS

The above objects and feature of the present invention will be apparent from the following description of the preferred embodiment with reference to the accompanying drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
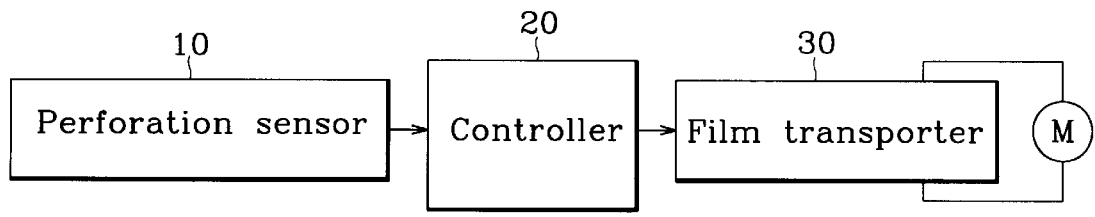
FIG. 1 is a block diagram of an apparatus for transporting a film according to the present invention.
Figure 2:
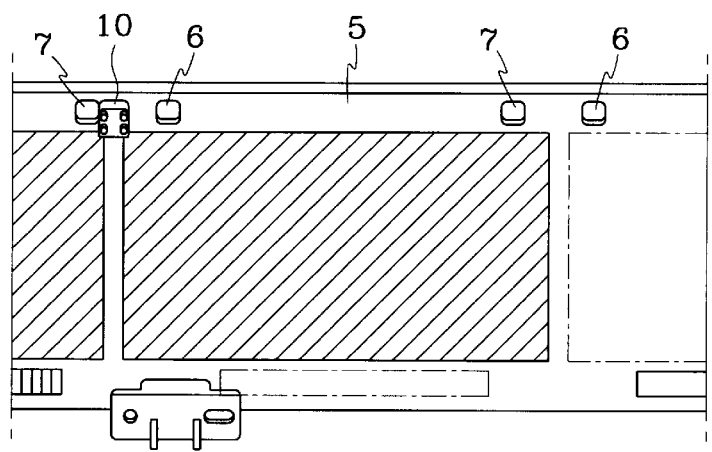
FIG. 2 shows a perforation sensor positioned in relation to film disposed in an APS camera.

As shown in FIG. 1, an apparatus for transporting a film in an APS camera in accordance with the present invention includes a perforation sensor 10, a controller 20, a film transporter 30, and a motor M.

The perforation sensor 10 emits a light beam along one edge of the film where perforations are formed, and receives the light beam through the perforation. When the perforation sensor 10 receives the light beam, it generates an electric signal which is sent to the controller 20.

The controller 20 is connected to the output terminal of the perforation sensor 10, and controls the film transport operation according to the electric signal outputted from the perforation sensor 10.

The film transporter 30 is connected to the output terminal of the controller 20 and causes the motor M to rotate in response to the signals outputted from the controller 20.

Therefore, the film is transported in a manner which winds or rewinds a frame of the film in accordance with the rotating direction of the motor M.

In one embodiment of the present invention, the perforation sensor 10 is provided at the position-facing perforations, and comprises an optical sensor which is capable of emitting a light beam as well as receiving the light beam through the perforation.

The operation of the present invention is as follows:

In a present embodiment, when an error occurs during transporting of the film, the controller 20 controls the film transporter 30 to start rewinding the film at the position where the error occurs. When the perforation sensor 10 detects that the state of the signal outputted from the perforation sensor 10 changes twice (i.e., two transitions) after the error has been detected, the controller 20 instructs the film transporter 30 to stop rewinding the film and then starts winding the film.

While the film is being wound, the time period during which a perforation is not sensed is counted. If the time period exceeds a predetermined time, the controller 20 stops winding the film at a position where the state of the output signal from the perforation sensor 10 changes. The predetermined time refers to an expected time necessary to wind a single frame of the film between the end of the first perforation and the start of the second perforation of the film. Because the transport speed of the film vaies as a function of the rotation speed of the motor which, in turn, is a function of the load on the motor, the predetermined time is generally in a range between a minimum and a maximum time.

Figure 3:
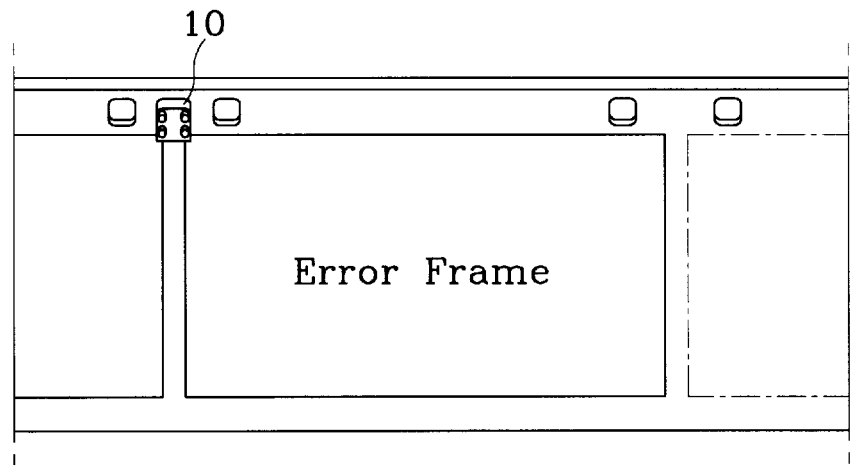
FIG. 3 shows control of the film transport operation according a signal outputted from the sensor in accordance with an embodiment of the present invention.
Figure 3:
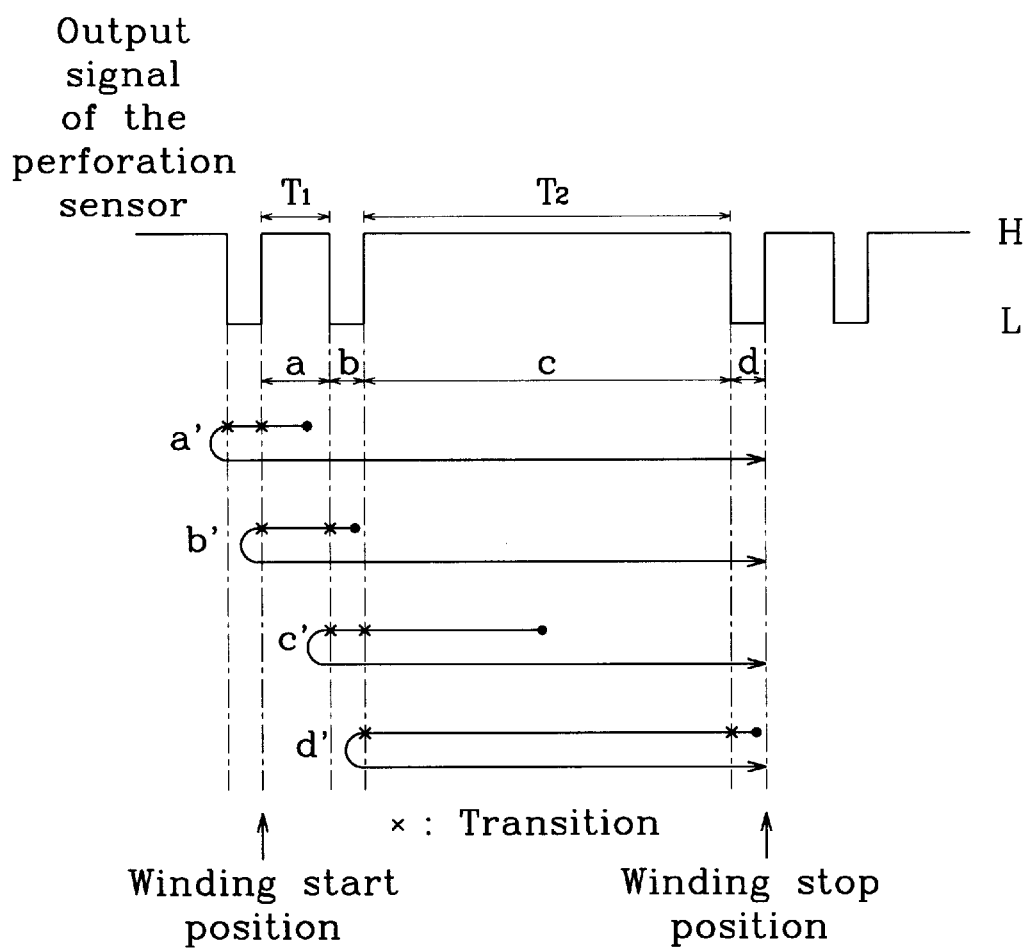
Figure 4:
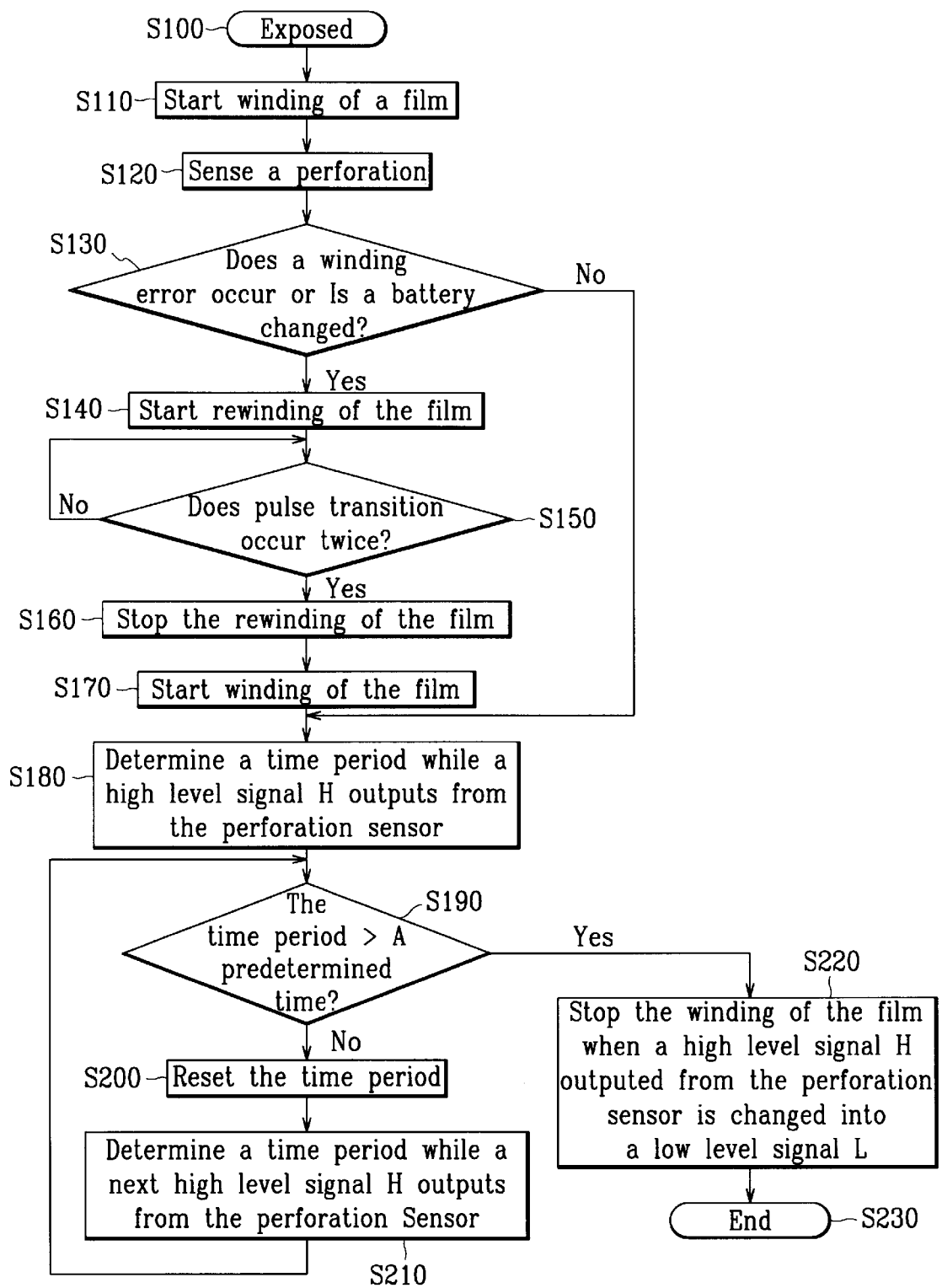
FIG. 4 is a flow chart illustrating a method for controlling the film transport operation according to an embodiment of the present invention.
Figure 5:
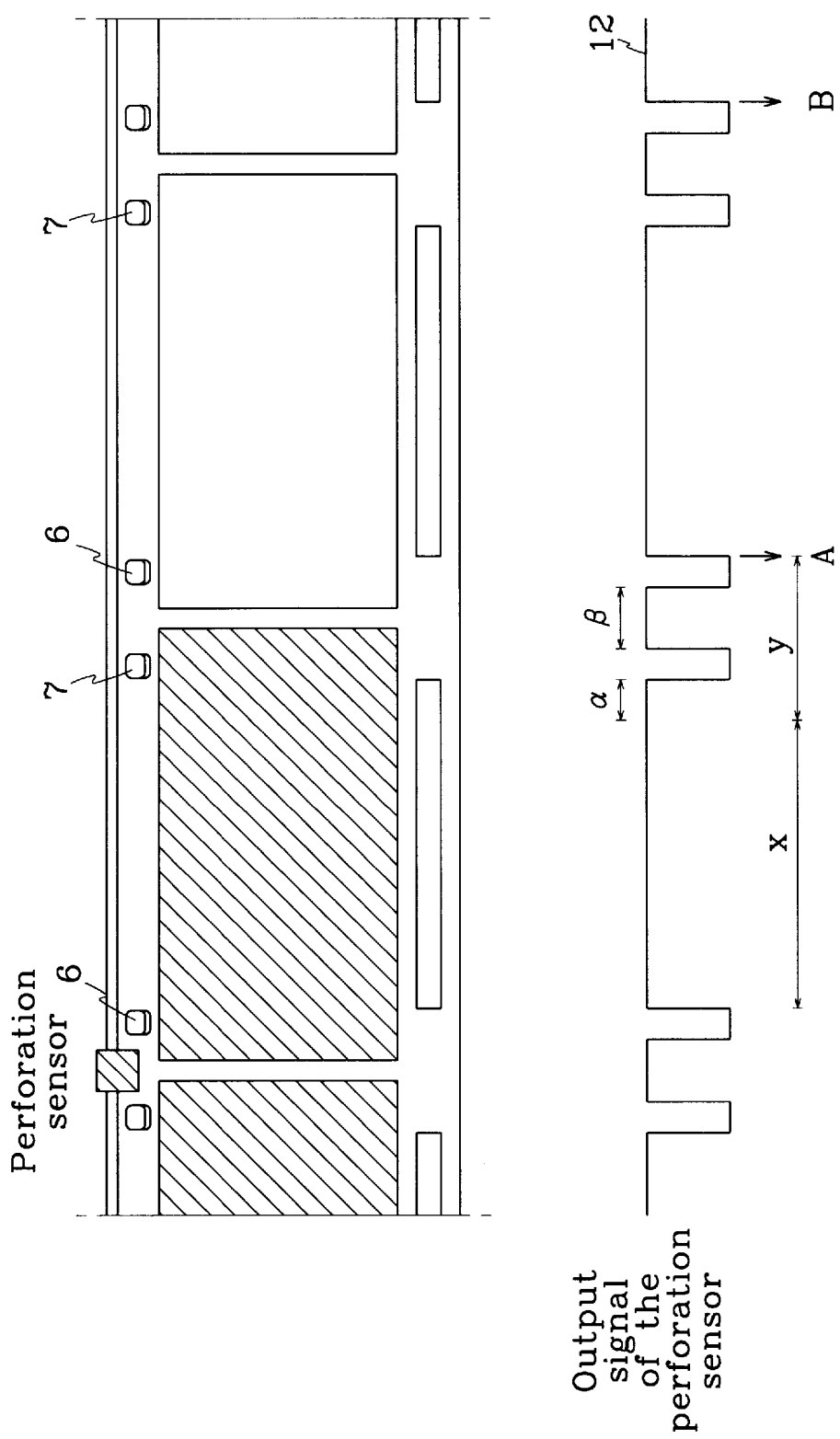
FIG. 5 shows control of the film transport operation of the prior art.

For example, as shown in FIGS. 3 4, after a frame of the film is exposed (S100), the controller 20 outputs a signal to the film transporter 30 to move the exposed frame. Specifically, the film transporter 30 receives the signal and causes the motor M rotate in the clockwise direction which advances (S110) the film to be wound on a take-up spool. Therefore, the film transport operation for winding the film starts.

The perforation sensor is used to sense whether a perforation exists along the edge of the film (S120). In particular, the perforation sensor 10 emits a light beam along the edge of the film surface where perforations are formed and outputs a pulse signal to the controller 20. The state of the pulse signal generated by the perforation sensor 10 changes according to whether or not the light beam passes through a perforation. For example, when the light beam is emitted through a perforation, the perforation sensor 10 receives the light beam passed through the perforation. When the light beam is emitted onto the film surface, the light beam is reflected by the film surface.

Referring to FIG. 4, the perforation sensor 10 outputs a low level signal L when a perforation is sensed. On the other hand, the perforation sensor 10 outputs a high level signal H when a perforation is not sensed.

After the controller 20 controls the film transporter 30 to wind an exposed frame of the film, the controller 20 determines whether or not a winding error has occurred in accordance with the output signal from the perforation sensor 10 (S130). The controller 20 also determines whether or not a battery which operates a camera has been changed.

For example, if the perforation sensor 10 does not output signals or the signals outputted from the perforation sensor 10 do not change during the film transport operation, the controller 20 determines that a winding error has occurred and the film is not being transported normally. Also, if power is interrupted or restarted, the controller 20 determines that the user is changing the battery.

When a winding error has occurred or power is interrupted (e.g., a battery is changed), the controller 20 controls the film transport operation in accordance with a signal outputted from the perforation sensor 10.

Specifically the controller 20 instructs the film transporter 30 to rewind the film (S140)by driving the motor M in the counter clockwise direction.

During rewinding, the controller 20 uses the signal outputted from the perforation sensor 10 to determine when the state of the signal has changed twice (S150). When two transitions are detected the controller 20 stops rewinding of the film at the position where the second transition occurs (S160).

After the controller 20 stops rewinding the film, the controller 20 instructs the film transporter 30 to begin winding the film and advance the film (S170). To advance the film, the film transporter 30 drives the motor M in a clockwise direction thereby winding the filmin accordance with rotation of the motor M.

Also, the controller 20 stores a time period T1 at which the perforation sensor 10 outputs a high level signal H between and ending perforation of one frame and a staring perforation of the next frame. Time period T1 is defined to be the counted time (S180). The controller 20 then compares the counted time with the predetermined time (S190). The predetermined time is always selected to be less than T2 and more than T1 as shown in FIG. 3.

If the counted time is less than the predetermined time, the controller 20 resets the time period (S200) and again stores time period T2 at which the perforation sensor 10 outputs a high level signal H (S210). Controller 20 then compares the counted time T2 with the predetermined time.

If the counted time T1 or T2 exceeds the predetermined time, the controller 20 stops winding of the film at the position where a state of the output signal by the perforation sensor 10 changes. That is, the controller 20 stops winding of the film when the perforation sensor 10 senses a change from a low level signal L to a high level signal H (S220) and the procedure ends (S230).

As shown in FIG. 3, when a winding error occurs within a first period a, rewinding of the film stops at the position a' where the state of a signal outputted from the perforation sensor 10 detected as having been changed twice once rewinding of the film starts. Next, the controller 20 starts control of winding of the film at the position a', after the controller 20 has counted a time period T1 during which a high level output signal H is generated from the perforation sensor 10. The controller 20 then defines the time period T1 as the counted time.

In the above case, because the counted time is less than the predetermined time, the controller 20 counts a time period T2 while the perforation sensor 10 outputs a high level signal until a next perforation is sensed, and again defines the time period T2 as the counted time. Defined in this way the counted time T2 now exceeds the predetermined time, the controller 20 stops winding of the film at a position where a signal outputted from the perforation sensor 10 changes from a low level signal L into a high level signal H.

When a winding error occurs at a second period b, the controller 20 operates in the same manner as when the winding error occurred within the first period a. Therefore, because the first counted time T1 is less than the predetermined time, the controller 20 again counts a time period T2 during the time the perforation sensor 10 outputs a high level signal H, and again defines this time period T2 as the counted time. Because the counted time T2 exceeds the predetermined time, the controller 20 stops winding of the film at a position where a signaloutputted from the perforation sensor 10 changes from a low level signal L into a high level signal H.

When a winding error occurs at the third period c, rewinding of the film stops at a position c' where a state of signal outputted by the perforation sensor 10 has changed twice after rewinding of the film starts.

Next, the controller 20 starts winding of the film at the c' position, and counts a time period T2 at which a high level signal H is first outputted from the perforation sensor 10 and defines the time period T2 as a counted time.

However, unlike the above situations where the winding error occurred within periods a or b, the counted time T2 in this case exceeds the predetermined time. Thus, the controller 20 stops winding of the film at a position where the outputted signal from the perforation sensor 10 changes from a low level signal L into a high level signal H.

When a winding error occurs at the fourth period d, the counted time T2 also exceeds the predetermined time. Therefore, the controller 20 controls the winding of the film in the same manner as when the winding error occurred within the third period c.

However, in step (S130), when a winding error does not occur or the battery has not been changed, the controller 20 has counted a time period at which the perforation sensor 10 outputs a high level signal H, and defines the time period as a counted time T1 (S180).

As described above, according to the preferred embodiment of the present invention related to the APS camera, although a winding error occurs or a battery is changed, an unexposed frame which would normally be wasted is still available to be exposed. Therefore one advantage of the APS camera in accordance with the present invention is that it minimizes waste of the film.

While it has been shown and described what is at present, considering the preferred embodiments of the invention, it will be obvious to those skilled in the art that various changes and modifications can by readily made therein without departing from the scope and sprit of the invention as defined by the appended claims.

What is claimed is:

1. A method for transporting film within an APS camera, comprising the steps of:

sensing perforations formed in a film within the APS camera and generating a signal according to a perforation sensed;

determining that a winding error has occurred or power to the camera has been interrupted;

stopping winding of the film;

rewinding the film to a predetermined position;

starting winding of the film;

counting during winding of the film a first time period during which a perforation is not sensed;

comparing the first time period with a predetermined time; and, if the first time period exceeds the predetermined time, stopping the winding of the film at a position where a state of the generated signal changes.

2. The method of claim 1, wherein the rewinding step;

includes stopping the rewinding of the film at a position where a state of the generated signal changes twice.

3. The method of claim 1, wherein the comparing step includes when the first time period is less than the predetermined time, determining a second time period during which a next perforation is sensed;

comparing the second time period with the predetermined time until the time period exceeds the predetermined time.

4. The method of claim 1, wherein the predetermined time is related to the expected time for winding between the end of a first perforation of a frame and the beginning of a second perforation to a second frame.

* * * * *